United States Patent
Cossairt et al.

(10) Patent No.: US 9,407,833 B2
(45) Date of Patent: Aug. 2, 2016

(54) SYSTEMS, METHODS, AND MEDIA FOR RECORDING AN IMAGE USING AN OPTICAL DIFFUSER

(75) Inventors: Oliver Cossairt, New York, NY (US); Changyin Zhou, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/522,943

(22) PCT Filed: Jan. 24, 2011

(86) PCT No.: PCT/US2011/022248
§ 371 (c)(1),
(2), (4) Date: Mar. 22, 2013

(87) PCT Pub. No.: WO2011/091358
PCT Pub. Date: Jul. 28, 2011

(65) Prior Publication Data
US 2013/0194458 A1  Aug. 1, 2013

Related U.S. Application Data

(60) Provisional application No. 61/297,667, filed on Jan. 22, 2010.

(51) Int. Cl.
*H04N 5/238* (2006.01)
*G06T 5/00* (2006.01)
(Continued)

(52) U.S. Cl.
CPC ............... *H04N 5/238* (2013.01); *G06T 5/003* (2013.01); *H04N 5/2254* (2013.01); *H04N 5/23212* (2013.01)

(58) Field of Classification Search
CPC . H04N 5/238; H04N 5/2254; H04N 5/23212; G06T 5/003
USPC .................................... 348/241, 335
See application file for complete search history.

(56) References Cited

U.S. PATENT DOCUMENTS 5,748,371 A    5/1998  Cathey et al.
7,176,960 B1 *  2/2007  Nayar et al. ............. 348/207.99
(Continued)

FOREIGN PATENT DOCUMENTS

CN      1768346     5/2006
CN     101305396    5/2012
(Continued)

OTHER PUBLICATIONS

Caulfield, H.J., "Kinoform Diffusers" In Proceedings of SPIE Conference Series, vol. 25, Oct. 14, 1971.
(Continued)

*Primary Examiner* — Roberto Velez
*Assistant Examiner* — Tuan Le
(74) *Attorney, Agent, or Firm* — Byrne Poh LLP (57) ABSTRACT

Systems, methods, and media for recording an image of a scene ate provided. In accordance with some embodiments, systems for recording an image of a scene are provided. comprising. a diffuser {hat diffuses light representing the scene and that has a scattering function that is independent of aperture coordinates, a sensor that receives diffused light representing the scene and generates data representing an image; and a hardware processes that uses a point spread function to deblur the image.

16 Claims, 9 Drawing Sheets

(51) Int. Cl.
*H04N 5/225* (2006.01)
*H04N 5/232* (2006.01)

(56) References Cited

U.S. PATENT DOCUMENTS

| | | | |
|---|---|---|---|
| 2002/0089586 | A1 | 7/2002 | Suzuki et al. |
| 2004/0190762 | A1* | 9/2004 | Dowski et al. ............... 382/128 |
| 2005/0057744 | A1 | 3/2005 | Pohle et al. |
| 2006/0055807 | A1* | 3/2006 | Pemer ..................... 348/333.11 |
| 2007/0035705 | A1 | 2/2007 | Hurd |
| 2007/0052953 | A1 | 3/2007 | Hill |
| 2007/0268585 | A1 | 11/2007 | Santoro et al. |
| 2010/0001176 | A1* | 1/2010 | Vigier-Blanc et al. ... 250/227.11 |
| 2010/0007900 | A1 | 1/2010 | Takeshita |
| 2010/0020187 | A1 | 1/2010 | Georgiev |

FOREIGN PATENT DOCUMENTS

| | | |
|---|---|---|
| JP | H0829678 | 2/1996 |
| JP | 2006-317605 | 11/2006 |
| JP | 2010134372 | 8/2008 |
| JP | 2009134023 | 6/2009 |
| JP | 2010-008794 | 1/2010 |
| WO | WO/2007/007225 | 1/2007 |
| WO | WO 2009/119838 | 1/2009 |

OTHER PUBLICATIONS

Dabov, K., et al., "Image Restoration by Sparse 3D Transform-Domain Collaborative Filtering", In Proceedings of SPIE Conference Series—Image Processing: Algorithms and Systems VI, vol. 6812, San Jose, CA, USA, Jan. 28-29, 2008.
Dong, B., et al., "Iterative Optimization Approach for Designing an Axicon with Long Focal Depth and High Transverse Resolution", In Journal for Optical Society of America A: Optics, Image Science, and Vision, vol. 13, No. 1, Jan. 1996, pp. 97-103.
Dowski Jr., E.R, and Cathey, W.T., "Extended Depth of Field Through Wavefront Coding", In Journal for Applied Optics, vol. 34, No. 11, Apr. 10, 1995, pp. 1859-1866.
Durand, F., et al., "A Frequency Analysis of Light Transport", In Proceedings of ACM SIGGRAPH '05, vol. 24, No. 3, Jul. 2005, pp. 1115-1126.
Garcia-Guerrero, E.E., et al., "Design and Fabrication of Random Phase Diffusers for Extending the Depth of Focus", In Journal for Optics Express, vol. 15, No. 3, Feb. 5, 2007, pp. 910-923.
Hausler, G., "A Method to Increase the Depth of Focus by Two Step Image Processing", In Journal for Optics Communications, vol. 6, No. 1, Sep. 1972, pp, 38-42.

International Preliminary Report on Patentability in International Patent Application No. PCT/US2011/022248, filed Jan. 24, 2011, mailed Aug. 2, 2012.
International Search Report in International Patent Application No. PCT/US2011/022248, filed Jan. 24, 2011, mailed Mar. 14, 2011.
Levin, A., et al., "4D Frequency Analysis of Computational Cameras for Depth of Field Extension", In ACM Transactions on Graphics (TOG)—Proceedings of ACM SIGGRAPH '09, vol. 28, No. 3, Aug. 2009.
Levin. A., et al., "Image and Depth from a Conventional Camera with a Coded Aperture", In ACM Transactions on Graphics (TOG)—Proceedings of ACM SIGGRAPH '07, vol. 26, No. 3, Jul. 2007.
Levoy, M. and Hanrahan, P., "Light Field Rendering", In Proceedings of the 23rd Annual Conference on Computer Graphics (SIGGRAPH '96), New Orleans, LA, USA, Aug. 4-9, 1996, pp. 31-42.
Nagahara, H., et al., "Flexible Depth of Field Photography", In Proceedings of the 10th European Conference on Computer Vision: Part IV (ECCW08), Marseille, FR, Oct. 12-18, 2008, pp. 60-73.
Ng, R., at al., "Light Field Photography with a Hand-Held Plenoptic Camera", Technical Report CSTR Feb. 2005, Stanford University, 2005.
Sales, T.R.M., "Structured Microlens Arrays for Beam Shaping", In Proceedings of SPIE—Laser Beam Shaping IV, vol. 5175, Nov. 2003, pp. 109-120.
Veeraraghavan, A., et al., "Dappled Photography: Mask Enhanced Cameras for Heterodyned Light Fields and Coded Aperture Refocusing", In Journal for ACM Transactions on Graphics (TOG)—Proceedings of ACM SIGGRAPH '07, vol. 26, No. 3, Jul. 2007.
Written Opinion in International Patent Application No. PCT/US2011/022248, filed Jan. 24, 2011, mailed Mar. 14, 2011.
Zhou, C. and Nayar, S., "What are Good Apertures for Defocus Deblurring?", In Proceedings of the IEEE International Conference on Computational Photography 2009 (ICCP '09), San Francisco, CA, USA, Apr. 16-17, 2009, pp. 1-8.
Office Action dated Sep. 3, 2013 in Japanese Patent Application No. 2012-550190.
Lesem, L.B. et al., "The Kinoform: A New Wavefront Reconstruction Device", In the IBM Journal of Research and Development, vol. 13, No. 2, Mar. 1969, pp. 150-155.
Office Action dated Mar. 10, 2015 in Japanese Patent Application No. 2014-125433.
Office Action dated Aug. 18, 2015 in Chinese Patent Application No. 201180011368.2.
Office Action dated Dec. 2, 2014 in Chinese Patent Application No. 201180011368.2.
English Translation of Office Action dated May 6, 2016 in Chinese Patent Application No. 201180011368.2.

* cited by examiner

SYSTEMS, METHODS, AND MEDIA FOR RECORDING AN IMAGE USING AN OPTICAL DIFFUSER

CROSS REFERENCE TO RELATED APPLICATIONS

This application claims the benefit of U.S. Provisional Patent Application No. 61/297,667, filed Jan. 22, 2010, which is hereby incorporated by reference herein in its entirety.

STATEMENT REGARDING FEDERALLY SPONSORED RESEARCH OR DEVELOPMENT

This invention was made with government support under Grant Numbers N00014-08-1-0329 and N00014-08-1-0638 awarded by the Navy/Office of Naval Research. The government has certain rights to the invention.

TECHNICAL FIELD

The disclosed subject matter relates to systems, methods, and media for recording an image using an optical diffuser.

BACKGROUND

For conventional cameras, there is a fundamental trade-off between depth of field (DOF) and noise. Generally, cameras have a single focal plane, and objects that deviate from this plane are blurred due to defocus. The amount of defocus blur depends on the aperture size and the distance from the focal plane. To decrease defocus blur and increase DOF, the aperture size must be decreased, reducing the signal strength of the recorded image as well. In many cases, it is desirable to have a DOF that is as large as possible so that all details in the scene are preserved. This is the case, for instance, in machine vision applications such as object detection and recognition, where it is desirable that all objects of interest be in focus. However, stopping down the lens aperture is not always an option, especially in low light conditions, because it can increase noise, which in turn can materially impact the recorded image.

SUMMARY

Systems, methods, and media for recording an image of a scene are provided. In accordance with some embodiments, systems for recording an image of a scene are provided, comprising: a diffuser that diffuses light representing the scene and that has a scattering function that is independent of aperture coordinates; a sensor that receives diffused light representing the scene and generates data representing an image; and a hardware processor that uses a point spread function to deblur the image.

In accordance with some embodiments, methods for recording an image of a scene are provided, the methods comprising: diffusing light representing the scene using a diffuser that has a scattering function that is independent of aperture coordinates; receiving diffused light representing the scene and generating data representing an image; and using a point spread function to deblur the image

DETAILED DESCRIPTION

Systems, methods, and media for recording an image using an optical diffuser are provided.

Figure 1:
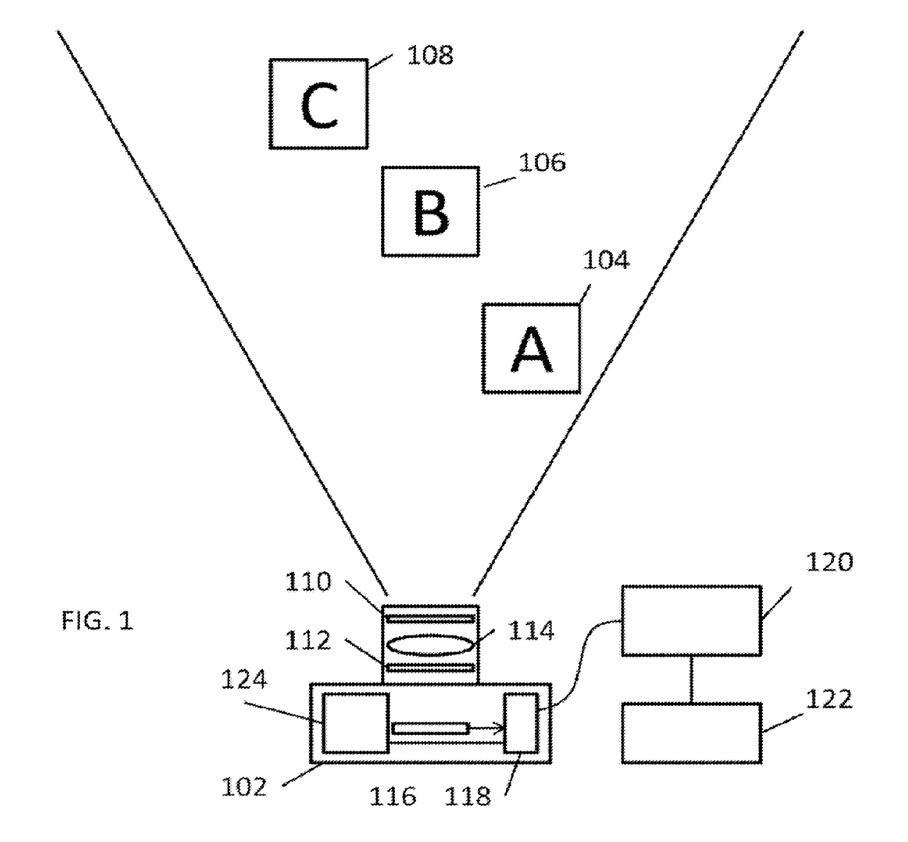
FIG. 1 is a diagram of a mechanism for recording an image in accordance with some embodiments.
Figure 2:
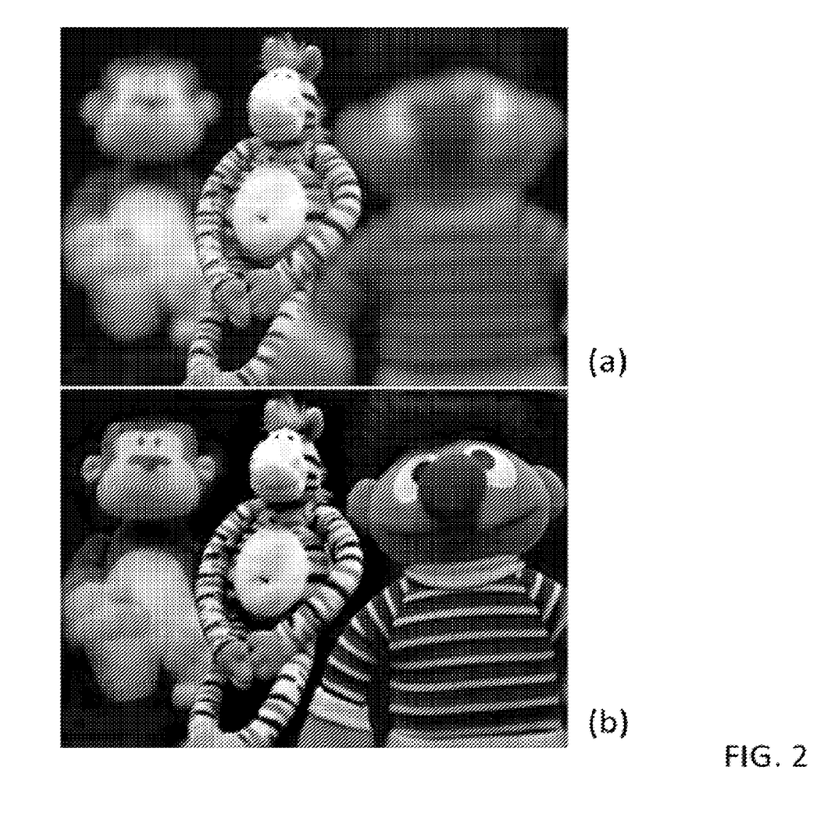
FIG. 2 is a combination of two images, one not using a diffuser (a) and one using a diffuser (b), in accordance with some embodiments.

Turning to FIG. 1, an illustration of an image recording mechanism 102 (e.g., a camera, video camera, mobile phone incorporating a camera, and/or any other suitable image recording mechanism) that is being used to capture an image including three objects, A 104, B 106, and C 108, is shown. As can be seen, these objects are at different depths with respect to mechanism 102. Because of limitations in the depth of field of mechanism 102, objects A 104 and C 108 may be out of focus when mechanism 102 is focused on object B 106. For example, these objects may be the toys shown in FIG. 2. As illustrated in FIG. 2(a), when a camera is focused on the center object (which may correspond to object B 106 of FIG. 1), the other objects may be out of focus. By using the mechanisms as described herein, however, an image can be recorded of such objects so that they appear to be in focus as illustrated in FIG. 2(b). This can be referred to as mechanism 102 having an extended depth of field.

In accordance with some embodiments, extended depth of field can be achieved by incorporating a diffuser 110 or 112 into an image recording mechanism 102. Recording an image using a diffuser in the pupil plane of an image recording mechanism can be referred to as diffusion coding. Such a diffuser can be located at any suitable point in the image recording mechanism. For example, a diffuser 110 can be positioned between a light source (e.g., objects 104, 106, and 108) and a lens 114 (e.g., as a lens attachment), a diffuser 112 can be positioned between a lens 114 and a sensor 116 (e.g., as part of a lens or a camera body), etc.

The diffusion coding image can then be detected by sensor 116 and then provided to a hardware processor 118 (incorporated into mechanism 102) and/or a hardware processor 120 (external to mechanism 102) for subsequent processing. This processing can include deblurring the sensed image using a PSF that is matched to the PSF of the diffuser. Any other suitable processing can additionally or alternatively be used. After such processing, an extended depth of field image can be presented on a display 124 (internal to mechanism 102) and/or a display 122 (external to mechanism 102).

In order to illustrate how such an image can be recorded using a diffuser, the optics of some embodiments are now described.

Figure 3:
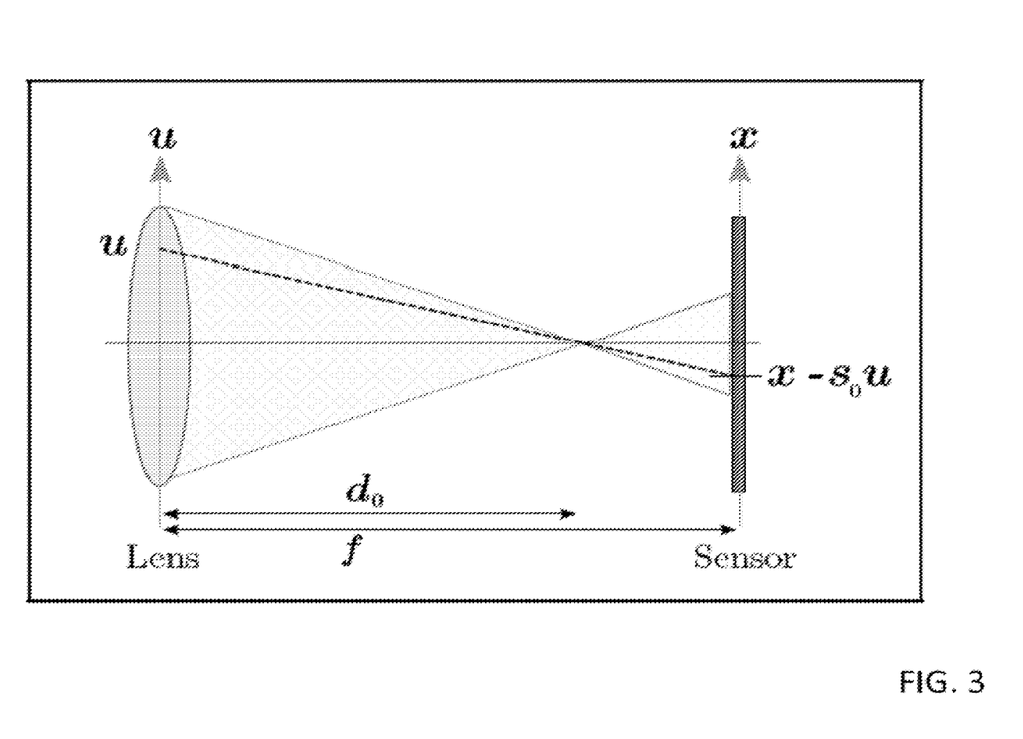
FIG. 3 is a diagram of a lens and a sensor in accordance with some embodiments.

As shown in FIG. 3, a light field $L(\bar{u},\bar{x})$ can be used to represent a four-dimensional set of rays propagating from an ideal lens with effective focal length (EFL) f to a sensor. A vector $\bar{u}=(u,v)$ can be used to denote the coordinates on the u-v plane, which is coincident with the exit pupil of the lens, and a vector $\bar{x}=(x,y)$ can be used to denote the coordinates on the x-y plane that is coincident with the sensor. The irradiance $E(\bar{x})$ observed on the sensor can be defined as the light field integrated over all ray angles:

$$E(\bar{x}) = \int_{\Omega_{\bar{u}}} L(\bar{u}, \bar{x}) d\bar{u}, \qquad (1)$$

where, $\Omega_{\bar{u}}$ is the domain of $\bar{u}$. For a scene with smooth depth variation, locally, the captured image $E(\bar{x})$ can be modeled as a convolution between a depth-dependent PSF kernel $P(\bar{x})$ and an all-in-focus image $I(\bar{x})$.

As described further below, in accordance with some embodiments, a camera PSF can be shaped so that an image $I(\bar{x})$ can be recovered from the captured image $E(\bar{x})$ by deblurring with a single PSF $P(\bar{x})$. The depth-dependence of the camera PSF can be analyzed by considering the image produced by a unit energy point source. For example, as shown in FIG. 3, consider a point source whose image comes to focus at a distance $d_0$ from the aperture of the lens. Assuming a rectangular aperture of width A, the light field produced by this point can be represented as:

$$L_\delta(\bar{u}, \bar{x}) = \frac{1}{A^2} \prod\left(\frac{\bar{u}}{A}\right) \delta(\bar{x} - s_0 \bar{u}), \qquad (2)$$

where $s_0=(d_0-f)/d$ is the defocus slope in light field space, and ∏ is the box function:

$$\prod\left(\frac{\bar{x}}{w}\right) = \begin{cases} 1 & \text{if } |\bar{x}_i| < \frac{1}{2}, \forall_i \\ 0 & \text{otherwise} \end{cases}. \qquad (3)$$

The image of this point is the camera PSF at the depth $d_0$, which is a box shaped PSF with defocus blur width $s_0 A$:

$$P(x) = \frac{1}{s_0^2 A^2} \prod\left(\frac{\bar{x}}{s_0 A}\right). \qquad (4)$$

The effect of a general kernel D applied to a light field L, which represents the effect of a diffuser placed in the aperture of a camera lens, can next be analyzed. The kernel can produce a new filtered light field $\hat{L}$, from which the modified PSF $\hat{P}$ can be derived as:

$$\hat{L}(\bar{u}, \bar{x}) = \int_{\Omega_{\bar{u}'}} \int_{\Omega_{\bar{x}'}} D(\bar{u}, \bar{u}', \bar{x}, \bar{x}') L(\bar{u}', \bar{x}') d\bar{u}' d\bar{x}', \qquad (5)$$

$$\hat{P}(\bar{x}) = \int_{\Omega_{\bar{u}}} \hat{L}(\bar{u}, \bar{x}) d\bar{u}, \qquad (6)$$

where $\Omega_{\bar{x}}$ is the domain of $\bar{x}$. This approach allows a large class of operations applied to a light field to be expressed. For instance, consider a kernel of the form $$D(\bar{u}, \bar{u}', \bar{x}, \bar{x}') = \frac{1}{w^2} \delta(\bar{u} - \bar{u}') \prod\left(\frac{\bar{x} - \bar{x}'}{w}\right). \qquad (7)$$

Figure 4:
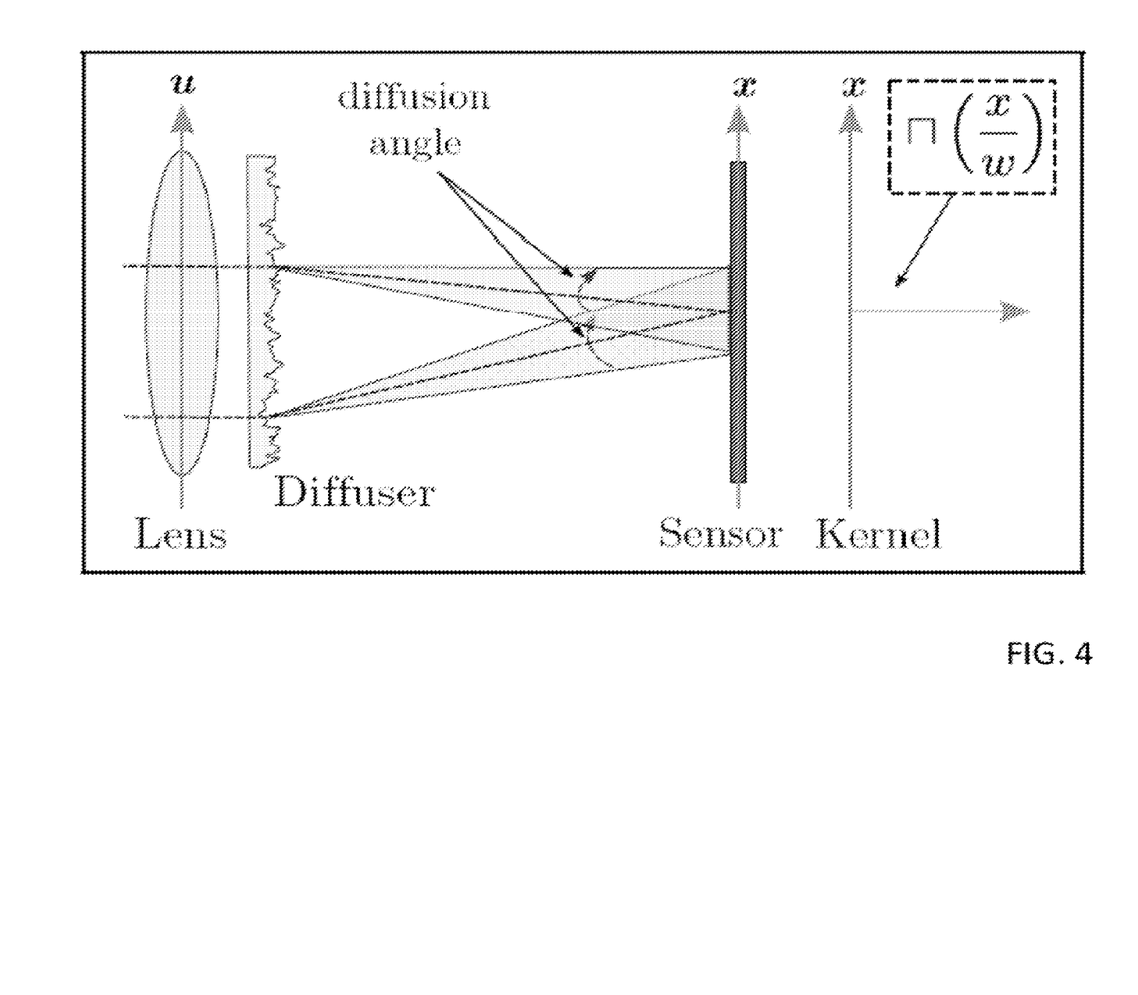
FIG. 4 is a diagram of a lens, a diffuser, and a sensor in accordance with some embodiments.

Note that here D takes the form of a separable convolution kernel with finite support in the $\bar{x}$ domain. The geometric meaning of this kernel can be illustrated as shown in FIG. 4. As shown, each ray in the light field is blurred so that, instead of piercing the sensor at a single location, it contributes to a square of width w. In order to understand the effect of the diffuser, an image E captured without the diffuser can be compared to an image $\hat{E}$ captured with it. For this diffuser kernel, substituting Equation 7 into Equations 5 and 6 gives:

$$\hat{P}(\bar{x}) = \frac{1}{w^2} \prod\left(\frac{\bar{x}}{w}\right) \otimes P(\bar{x}), \qquad (8)$$

where $\otimes$ denotes convolution. The modified PSF can be the camera PSF blurred with a box function. Therefore, the effect of the diffuser is to blur the image that would be captured were it not present. However, the diffuser given by the kernel in Equation 7 may not be useful for extending depth of field because it does not increase depth independence or preserve high frequencies in the camera PSF.

In general, the kernel for any diffuser that is placed in the aperture can be represented as:

$$D(\bar{u},\bar{u}',\bar{x},\bar{x}')=\delta(\bar{u}-\bar{u}')k(\bar{u},\bar{x}-\bar{x}'), \qquad (9)$$

where k is called the scatter function. As can be seen, the diffuser has no effect in the $\bar{u}$ domain, but has the effect of a convolution in the $\bar{x}$ domain. For the diffuser given by Equation 7, the scatter function can be represented as a two-dimensional box function:

$$k(\bar{u}, \bar{x}) = \frac{1}{w^2} \prod\left(\frac{\bar{x}}{w}\right).$$

Figure 5:
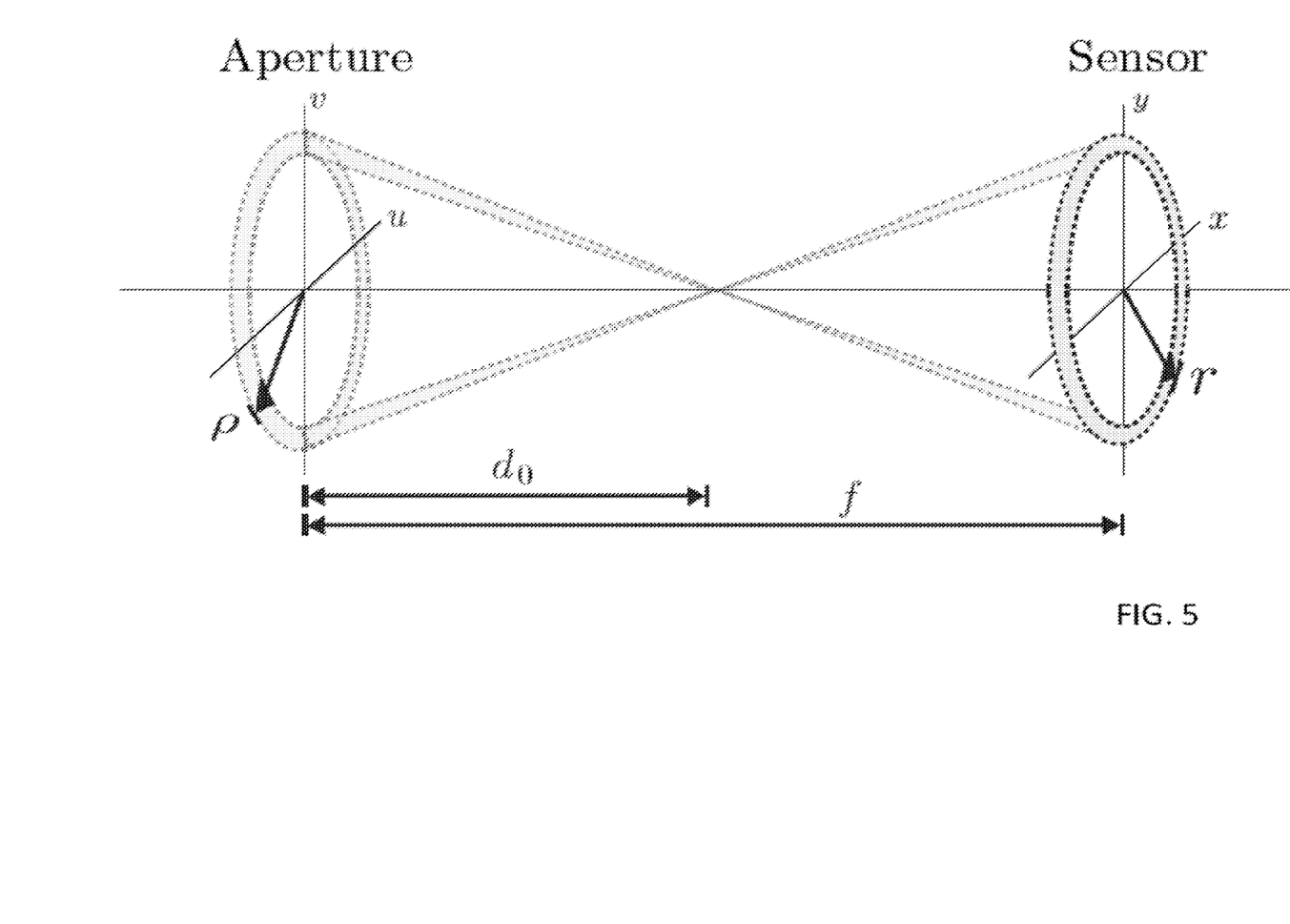
FIG. 5 is a diagram illustrating a light field on a sensor in accordance with some embodiments.

By changing from rectangular coordinates (u, v, x, y) to polar coordinates ($\rho, \phi, r, \theta$) using the relations $u=\rho \cos \phi$, $v=\rho \sin \phi$, $x=r \cos \theta$, and $y=r \sin \theta$, a polar system where $\rho, r \in (-\infty,\infty)$ and $\theta, \phi \in (0,\pi)$ and a circular aperture with diameter A can be considered. In this system, the light field representing a unit-energy point source located at distance $d_0$ can be written as:

$$L_\delta(\rho, r) = \frac{4}{\pi A^2} \prod\left(\frac{\rho}{A}\right) \frac{\delta(r - s_0 \rho)}{\pi |r|}, \qquad (10)$$

which is independent of both $\theta$ and $\phi$ because the source is isotropic. Note that verifying unit-energy can be carried out trivially by integrating $L_\delta(\rho,r)$ in polar coordinates. Comparing the parameterizations for the light field of a point source in Equations 2 and 10, it can be seen than a slice of $L_\delta(\bar{x},\bar{y})$ represents a single ray, while a slice $L(\rho,r)$ represents a 2D set of rays. In the radially symmetric parameterization, a slice of the light field represents a conic surface connecting a circle with radius $\rho$ in the aperture plane to a circle of radius r on the sensor (see FIG. 5).

A radially symmetric diffuser produces a drastically different effect than the diffuser given by Equation 7. When a radially symmetric diffuser is introduced, neither the diffuser nor the lens deflects rays tangentially, and therefore the diffuser kernel and modified light field can be represented using the reduced coordinates (ρ,r). Equations 5 and 6 then become:

$$\hat{L}(\rho, r) = \pi^2 \int_{\Omega_\rho} \int_{\Omega_r} D(\rho, \rho', r, r') L(\rho', r) |\rho'| d\rho' |r'| dr', \quad (11)$$

$$E(r) = \pi \int_{\Omega_\rho} \hat{L}(\rho, r) |\rho| d\rho, \quad (12)$$

and the general form of the diffuser kernel becomes:

$$D(\rho, \rho', r, r') = \frac{\delta(\rho - \rho')}{\pi |\rho'|} \frac{k(r - r' \cdot \rho)}{\pi |r|} \quad (13)$$

The same box-shaped scattering function as was used for the diffuser kernel in Equation 7 can be used for Equation 13:

$$k(r, \rho) = \frac{1}{w} \prod \left(\frac{r}{w}\right). \quad (14)$$

Figure 6:
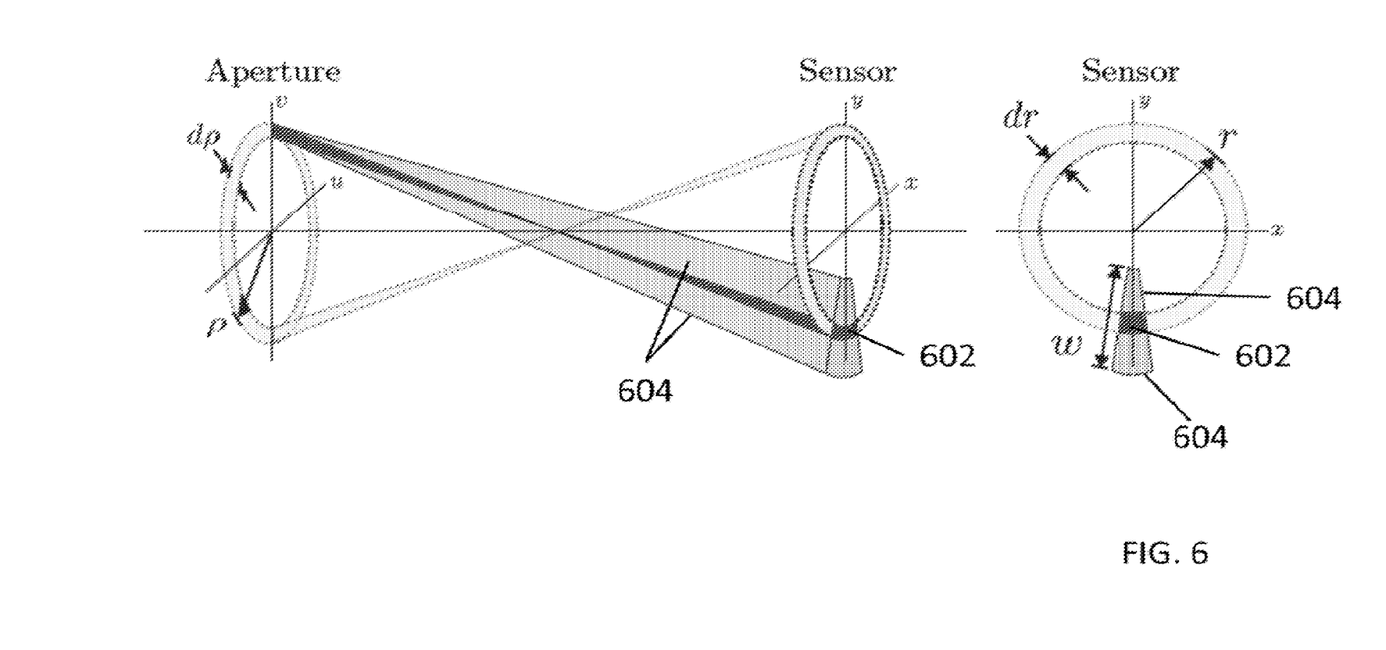
FIG. 6 is a diagram of a ray and the scattering of the ray in accordance with some embodiments.

However, the physical interpretation of this diffuser is different than the previous diffuser. For the previous diffuser, each ray in the light field is scattered so that it spreads across a square on the sensor. The effect of the scattering function in Equation 14, however, is as illustrated in FIG. 6. As shown, in the absence of the diffuser, light from an annulus of width dp and radius p in the aperture plane projects to an annulus of width dr and radius r on the sensor. The effect of the scatter function in Equation 14 is to spread the light incident on the sensor so that it produces an annulus of width w instead.

As illustrated by volume 602 in FIG. 6, in polar coordinates, a ray can be a small annular section that travels from the aperture plane to the sensor plane. The effect of the diffuser, which is to scatter a ray along a radial line of width w, can be as illustrated by volume 604.

Figure 9:
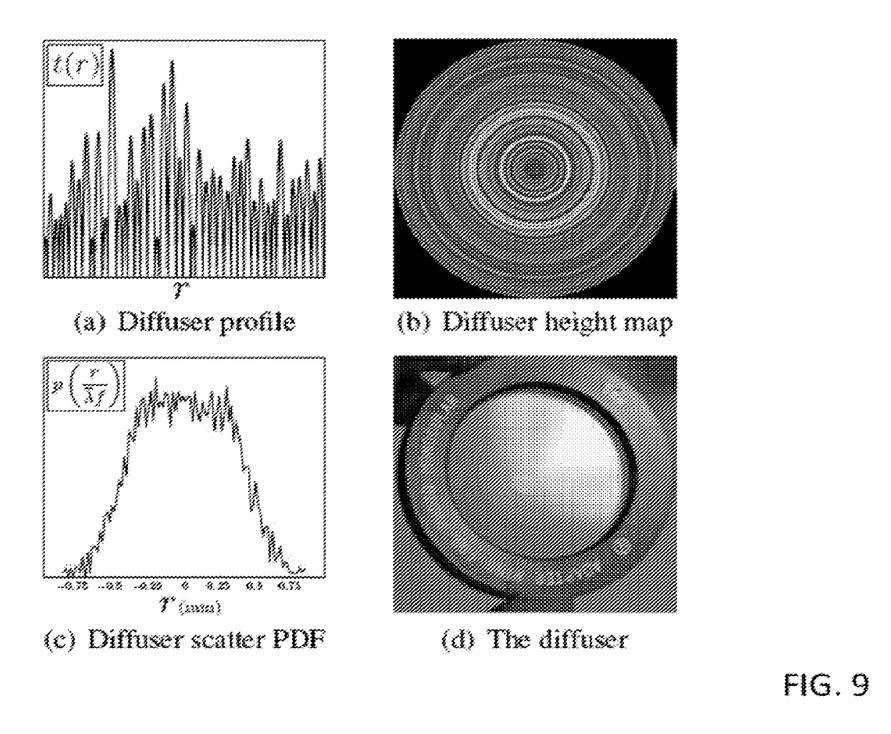
FIG. 9 is combination of diagrams of a diffuser profile (a), a diffuser height map (b), a diffuser scatter PDF (c), and a diffuser (d) in accordance with some embodiments.

A box-shaped scatter function can be used here for notational convenience, but a Gaussian scattering function (e.g., as illustrated in FIG. 9(c)) can be superior for extended DOF imaging. The light field of a point source filtered by this diffuser kernel and PSF can be shown to be:

$$\hat{L}(\rho, r) = \frac{4}{\pi A^2} \prod \left(\frac{\rho}{A}\right) \frac{\prod \left(\frac{r - s_0 \rho}{w}\right)}{\pi w |r|}, \quad (15)$$

$$\hat{P}(r) = \frac{4}{\pi s_0^4 A^2} \frac{1}{w|r|} \left[ \prod \left(\frac{r}{w}\right) \otimes \left( \prod \left(\frac{r}{s_0 A}\right) \cdot |r| \right) \right]. \quad (16)$$

The analytic solution for this PSF is a piecewise function due to the contribution from the term in brackets, which is a convolution between the two rect functions (one weighted by |r|). Note that as the scattering width w is reduced to zero, the first rect (combined with 1/w) approaches a delta function and the result is a pillbox-shaped defocus PSF. Also note that if a different diffuser with different scattering function is used, the first rect is simply replaced with the new scattering function. However, the convolution term is far less significant than the 1/|r| term, whose effect dominates, resulting in a PSF which can be strongly depth independent while still maintaining a strong peak and preserving high frequencies.

As illustrated in FIG. 6, light incident on a small annular region of width δr and radius r emanates from an annulus in the aperture, and its energy can be proportional to ρ or equivalently to r/s₀. This explains the presence of the |r| multiplier within the term in brackets of Equation 16. This term in brackets states that the energy in a pillbox defocus PSF annulus is spread uniformly along radial lines of width w by the diffuser, as shown on the right hand side of FIG. 6. The 1/|r| term in Equation 16 can be attributed to the fact that the energy density becomes larger for light that is scattered closer to the center of the PSF.

Figure 7:
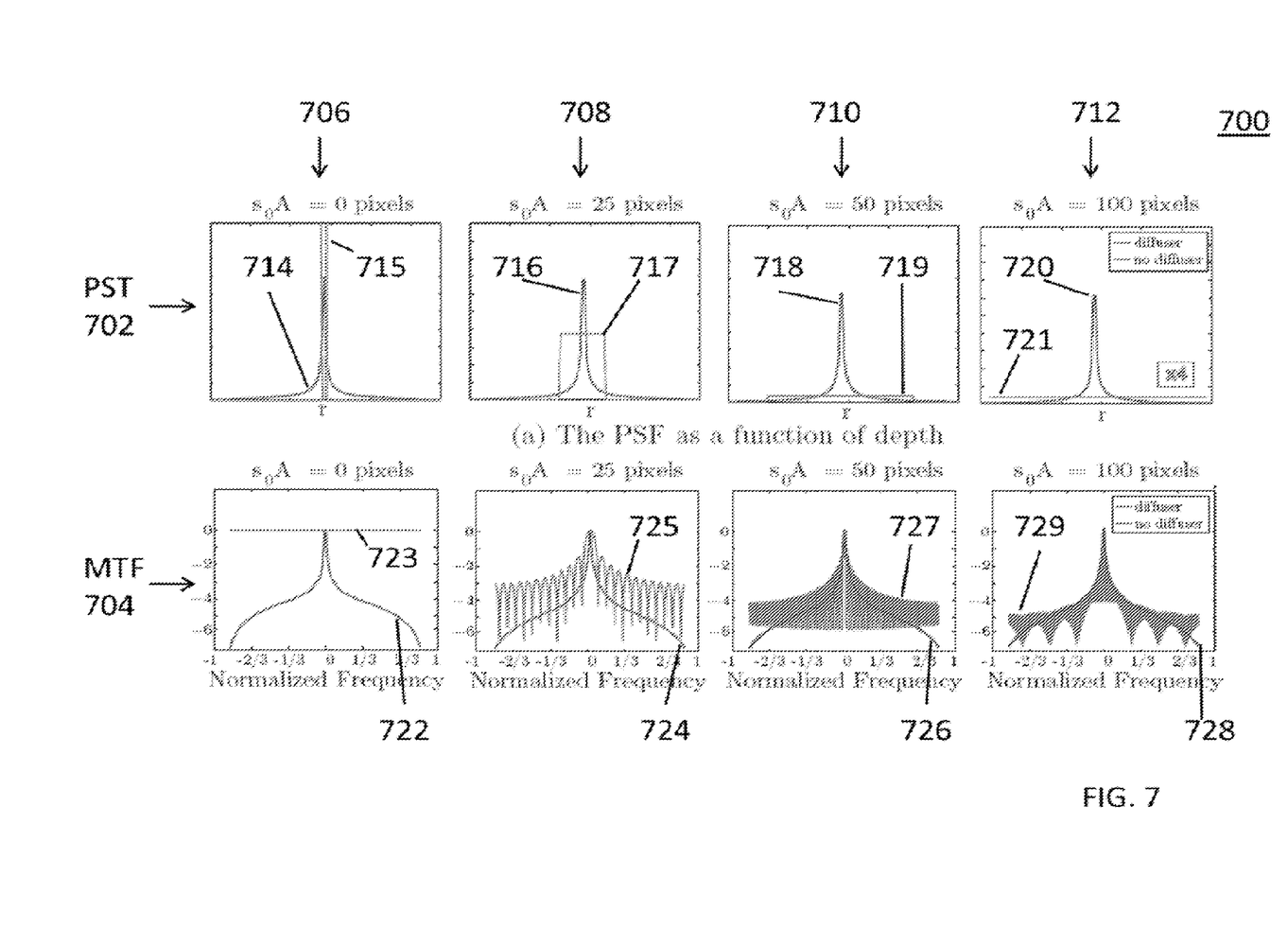
FIG. 7 is a combination of point-spread-function and modulation-transfer-function graph pairs in accordance with some embodiments.

FIG. 7 shows several PSF 702 and Modulation Transfer Function (MTF) 704 graph pairs for a camera with (714, 716, 718, 720, 722, 724, 726, and 728) and without (715, 717, 719, 721, 723, 725, 727, and 729) the diffuser given by Equation 16. The defocus blur diameter s₀A changes between 0 pixels 706, 25 pixels 708, 50 pixels 710, and 100 pixels 712. The scatter function of Equation 14 is a Gaussian instead of a box function, and the diffuser parameter w (the variance of the Gaussian) is chosen so that w=100 pixels. Note that when the diffuser is present, there is little variation with depth for either the PSF or MTF. Introducing the diffuser also eliminates the zero crossings in the MTF. For smaller defocus values, the diffuser suppresses high frequencies in the MTF. However, because the diffuser MTF does not vary significantly with depth, high frequencies can be recovered via deconvolution.

In accordance with some embodiments, diffusers of the "kinoform" type (as described in Caufield, H. J., "Kinoform Diffusers," In SPIE Conference Series, vol. 25, p. 111, 1971, which is hereby incorporated by reference herein in its entirety) where the scattering effect is caused entirely by roughness variations across a surface can be used. Such a diffuser can be considered to be a random phase screen, and according to statistical optics, for a camera with effective focal length f, and center wavelength $\bar{\lambda}$, the effect of placing this screen in the aperture of the camera can result in the following:

$$\hat{P}(x, y) \propto p_{\phi_u, \phi_v}\left(\frac{x}{\bar{\lambda}_k}, \frac{y}{\bar{\lambda}_k}\right), \quad (18)$$

where $\phi_u$ and $\phi_v$ are the u and v derivatives of the phase shift induced by the surface, and $p_{\phi_x, \phi_y}$ is the joint probability of these derivatives. The result of Equation 18 is that a diffuser can be implemented by creating an optical element with thickness t(u,v), where the gradient of this surface $\nabla t(u,v)$ is sampled from a probability distribution which is also a desired PSF. Intuitively, this equation can be understood as follows: $p_{\phi_u, \phi_v}$ denotes the fraction of the surface t(u,v) with slope ($\phi_u, \phi_v$). For small angles, all incoming rays incident on this fraction of the surface will be deflected at the same angle, since the slope is constant over this region. Thus, the quantity $p_{\phi_u, \phi_v}$ also reflects the portion of light that will be deflected by the slope ($\phi_x, \phi_y$).

Figure 8:
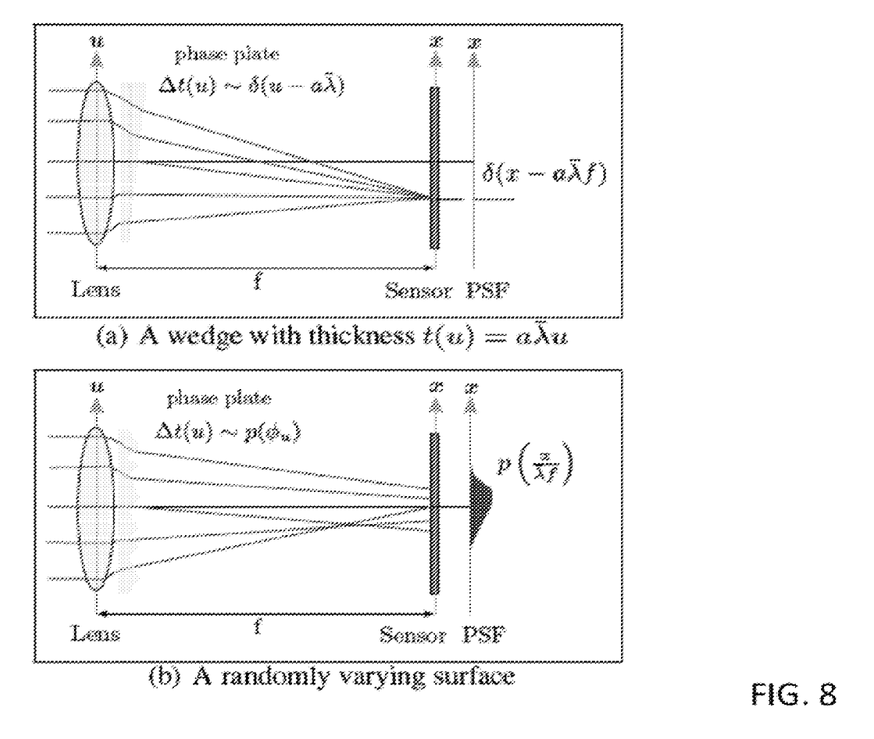
FIG. 8 is a diagram an optical system including a wedge (a) and a random varying surface in accordance with some embodiments.

A Kinoform diffuser has a randomly varying surface with a general probability distribution of slopes as illustrated in FIG. 8(b). Kinoform diffusers can be thought of as generalized phase plates. For example, a regular deterministic phase plate with thickness t(u)=α$\bar{\lambda}$u, as shown in FIG. 8(a), can also be thought of as having a slope drawn from a probability function p($\phi_u$) which is a delta function. The result of placing this phase plate in the pupil plane of a camera is to shift the PSF, which can be thought of as convolving p($\phi_u$) with the PSF.

To implement the diffuser defined in Equation 14, the diffuser surface can be implemented as a sequence of quadratic elements whose diameter and sag is drawn from a random distribution as described in Sales, T. R. M., "Structured microlens arrays for beam shaping," Optical Engineering 42, 11, pp. 3084-3085, 2003, which is hereby incorporated by reference herein in its entirety. The scatter function of the diffuser can be designed to be roughly Gaussian with 0.5 mm variance (corresponding to w=1 mm in Equation 16) as shown in FIG. 9(c). To create a radially symmetric diffuser, a one-dimensional random profile can be created and then a polar transformation applied to create a two-dimensional surface (see, e.g., FIGS. 9(a) and 9(b)).

In some embodiments, a diffuser can be made using laser etching.

In some embodiments, the maximum height of the diffuser surface can be 3 μm, and the diffuser can be fabricated using a laser machining technology which has a minimum spot size of about 10 μm. To ensure that each quadratic element in the diffuser is fabricated with high accuracy, the minimum diameter of a single element can be chosen to be 200 μm, resulting in a diffuser with 42 different annular sections.

Any suitable hardware can be used to implement a mechanism 102 in accordance with some embodiments. For example, a Canon EOS 450D sensor from Canon U.S.A., Inc. can be used as sensor 116, a 22 mm diameter diffuser (e.g., as illustrated in FIG. 9(d)) that is laser etched in a piece of suitable optical glass by RPC Photonics of Rochester, N.Y. can be used as diffuser 110 or 112, and a 50 mm f/1.8 lens from Canon U.S.A., Inc. can be used as lens 114. As another example, lens 114 can have any focal length and consist of refractive optics, reflective optics, or both. For instance, a 3048 mm focal length Meade LX200 telescope (available from) can be used in some embodiments.

In accordance with some embodiments, any suitable processing can be performed to deblur the image hitting a camera sensor after passing through a lens and diffuser (in either order). For example, the Wiener deconvolution with the PSF at the center depth can be used to deblur the sensed images. Any suitable additional or alternative processing on the images can be used. For example, additional deblurring of diffusion coded images can performed using the BM3D deblurring algorithm as described in Dabov, K., Foi, A., Katkovnik, V., and Egiazarian, K., "Image restoration by sparse 3D transform-domain collaborative filtering," In SPIE Conference Series, vol. 6812, 681207, 2008, which is hereby incorporated by reference herein in its entirety. In some embodiments, the BM3D deblurring algorithm enforces a piecewise smoothness prior that suppresses the noise amplified by the deblurring process.

Any suitable hardware processor, such as a microprocessor, digital signal processor, special purpose computer (which can include a microprocessor, digital signal processor, a controller, etc., memory, communication interfaces, display controllers, input devices, etc.), general purpose computer suitably programmed (which can include a microprocessor, digital signal processor, a controller, etc., memory, communication interfaces, display controllers, input devices, etc.), server, programmable gate array, etc. can be used to deblur the image captured by the sensor. Any suitable hardware can by used to transfer the image from the sensor to the processor. Any suitable display, storage device, or printer can then be used to display, store, or print the deblurred image.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for recording an image of a scene, comprising:
    an image sensor that receives light representing the scene and generates image data representing a first image based on light representing the scene;
    a radially symmetric diffuser having a first side that receives light representing the scene and a second side and a one-dimensional thickness profile of the radially symmetric diffuser along a radial direction is random such that each ray of light passing through the radially symmetric diffuser from the first side to the second side forms a section of an annulus on the image sensor having a width w that is the difference between an inner radius and an outer radius of the annulus, such that w is larger than a width of a section of annulus that the ray of light would form in the absence of the radially symmetric diffuser, wherein width w is substantially constant regardless of where along the radial direction the ray of light passes through the radially symmetric diffuser; and
    a hardware processor that uses a point spread function corresponding to width w to generate a second image based on the image data representing the first image and that corresponds to a deblurred version of the first image.

2. The system of claim 1, wherein the diffuser is made by laser etching.

3. The system of claim 1, wherein the diffuser is of the kinoform type.

4. The system of claim 1, wherein a scattering function of the diffuser is a symmetric distribution function.

5. The system of claim 4, wherein the symmetric distribution function of the diffuser is perturbed Gaussian.

6. The system of claim 1, further comprising a lens that passes the light representing the scene before it is incident on the diffuser.

7. The system of claim 1, further comprising a lens that is positioned between the diffuser and the sensor.

8. The system of claim 1, further comprising a display that displays the deblurred image.

9. A method for recording an image of a scene, comprising:
    diffusing light representing the scene using a radially symmetric diffuser having a first side that receives light representing the scene and a second side and a one-dimensional thickness profile of the radially symmetric diffuser along a radial direction is random such that each ray of light passing through the radially symmetric diffuser from the first side to the second side forms a section of an annulus on the image sensor having a width w that is the difference between an inner radius and an outer radius of the annulus, such that w is larger than a width of a section of annulus that the ray of light would form in the absence of the radially symmetric diffuser, wherein width w is substantially constant regardless of where along the radial direction the ray of light passes through the radially symmetric diffuser; and receiving light representing the scene using an image sensor;

generating image data representing a first image based on the light representing the scene received by the image sensor;

using a point spread function corresponding to width w to generate a second image based on the image data representing the first image that corresponds to a deblurred version of the first image.

10. The method of claim 9, wherein the diffuser is made by laser etching.

11. The method of claim 9, wherein the diffuser is of the kinoform type.

12. The method of claim 9, wherein a scattering function of the diffuser is a symmetric distribution function.

13. The method of claim 12, wherein the symmetric distribution function of the diffuser is perturbed Gaussian.

14. The method of claim 9, further comprising positioning a lens so that the light representing the scene passes through the lens before it is incident on the diffuser.

15. The method of claim 9, further comprising positioning a lens between the diffuser and the sensor.

16. The method of claim 9, further comprising displaying the deblurred image.

* * * * *